US012603457B2

(12) United States Patent
Klimpel et al.

(10) Patent No.: US 12,603,457 B2
(45) **Date of Patent: *Apr. 14, 2026**

(54) PLUG-IN CONTACT DEVICE FOR PREVENTING AN ARC WHEN SEPARATING A DIRECT CURRENT CONNECTION

(71) Applicant: Phoenix Contact GmbH & Co. KG, Blomberg (DE)

(72) Inventors: Marc Klimpel, Lage (DE); Fredrik Brand, Schieder-Schwalenberg (DE); Karsten Krome, Detmold (DE); Ruediger Meyer, Bad Pyrmont (DE); Rainer Durth, Horn-Bad Meinberg (DE); Markus Hanses, Hoexter (DE); Martin Schaefers, Paderborn (DE); Ralf Beckmann, Detmold (DE); Sebastian Loke, Luedge (DE); Philipp Juergensmeier, Barntrup (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 897 days.

This patent is subject to a terminal disclaimer.

(21) Appl. No.: 17/785,454

(22) PCT Filed: Dec. 16, 2020

(86) PCT No.: PCT/EP2020/086513

§ 371 (c)(1),
(2) Date: Feb. 17, 2023

(87) PCT Pub. No.: WO2021/122811

PCT Pub. Date: Jun. 24, 2021

(65) Prior Publication Data

US 2023/0178925 A1 Jun. 8, 2023

(30) Foreign Application Priority Data

Dec. 19, 2019 (DE) ..................... 10 2019 135 128.6

(51) Int. Cl.
*H01R 13/53* (2006.01)
*H01H 9/54* (2006.01)
(Continued)

(52) U.S. Cl.
CPC ............... *H01R 13/53* (2013.01); *H01H 9/54* (2013.01); *H01R 13/6473* (2013.01); *H01R 13/703* (2013.01)

(58) Field of Classification Search
None
See application file for complete search history.

(56) References Cited

U.S. PATENT DOCUMENTS

2014/0154904 A1 6/2014 Strobl et al.
2016/0294125 A1* 10/2016 Hsu .................... H01R 13/7038
(Continued)

FOREIGN PATENT DOCUMENTS

DE 10253749 A1 6/2004
DE 102007043512 A1 3/2009
(Continued)

*Primary Examiner* — Rexford N Barnie
*Assistant Examiner* — Esayas G Yeshaw
(74) *Attorney, Agent, or Firm* — LEYDIG, VOIT & MAYER, LTD.

(57) ABSTRACT

A plug-in contact device for preventing or extinguishing an arc when separating or closing a direct current connection includes: at least one plug-in connector each having a main contact, HA, and an auxiliary contact, HI, the HA including a first contact half, HA1, and a second contact half, HA2, which are releasably plugged together. The HA: electrically conductively connects the HA1 and the HA2 in a plugged-together state of the respective plug-in connector, galvanically separates the HA1 and the HA2 in a released state of the respective plug-in connector, electrically conductively connects the HA1 and the HA2 in a first intermediate state of the respective plug-in connector between the plugged-together state and the released state, and galvanically sepa-
(Continued)

(State of the art)

rates the HA1 and the HA2 in a second intermediate state of the respective plug-in connector between the first intermediate state and the released state.

20 Claims, 5 Drawing Sheets

(51) Int. Cl.
*H01R 13/6473* (2011.01)
*H01R 13/703* (2006.01)

(56) References Cited

U.S. PATENT DOCUMENTS

| | | | | |
|---|---|---|---|---|
| 2017/0288348 | A1* | 10/2017 | Pohl | G01R 31/69 |
| 2018/0006447 | A1 | 1/2018 | Morita | |
| 2020/0244015 | A1* | 7/2020 | Henke | H01H 50/44 |

FOREIGN PATENT DOCUMENTS

| | | | |
|---|---|---|---|
| DE | 102012008614 | A1 | 10/2013 |
| DE | 102015224268 | A1 | 6/2016 |
| EP | 2742565 | B1 | 3/2017 |

* cited by examiner

Fig. 1 (State of the art)

PLUG-IN CONTACT DEVICE FOR PREVENTING AN ARC WHEN SEPARATING A DIRECT CURRENT CONNECTION

CROSS-REFERENCE TO PRIOR APPLICATIONS

This application is a U.S. National Phase application under 35 U.S.C. § 371 of International Application No. PCT/EP2020/086513, filed on Dec. 16, 2020, and claims benefit to German Patent Application No. DE 10 2019 135 128.6, filed on Dec. 19, 2019. The International Application was published in German on Jun. 24, 2021 as WO/2021/122811 under PCT Article 21(2).

FIELD

The invention relates to a plug-in contact device for preventing or extinguishing an arc when separating (or disconnecting) or closing (or connecting) a direct current connection.

BACKGROUND

In contrast to an alternating current application (AC application), an arc has to be increasingly expected when separating (or disconnecting) or closing (or connecting) a direct current connection (DC connection). Especially in the case of plug-in connectors, this represents a challenge. On the one hand, the arc leads to damages to the plug-in connector, to housing parts as well as to the contacts. On the other hand, the arc also carries a risk for the operator.

There are different concepts for extinguishing the arc using mechanical aids, such as, for example, sacrificial zones, or by means of a so-called blow magnet (due to the Lorentz force acting on the plasma of the arc) or due to a speed of the contact separation.

A further alternative is electronic spark extinguishing (or spark quenching). The arc is thereby suppressed with the help of electronic components. The principle can be compared to an electronic switch. As in the case of a mechanical switch, the circuit is interrupted. Due to the fact, however, that no physical contact is opened or separated, this does not cause an arc. The circuit is interrupted by means of electronic components. Semiconductor component parts, such as insulated-gate bipolar transistors (IGBTs), metal oxide semiconductor field effect transistors (MOSFETs), or also varistors thereby shift the switching power to the electronic subassemblies, and the contacts are thus protected. Such technologies are described, for example, in the publications EP 2 742 565 B1, US 2018/0006447 A1, DE000010253749A1, and DE10 2007 043 512 A1.

The current during normal operation thereby flows either permanently via the electronics, which continuously generates power loss, or the current flow is briefly conducted via the electronics and is switched off during the switching process, which is significantly better in terms of energy. An additional auxiliary contact is required in this case, which lies parallel to one of the load contacts and which provides for the current flow via the electronics. These variations, as described, for example, in the publications EP 2 742 565 B1 and US 2018/0006447 A1, can be integrated both into a plug-in connector housing and can be accommodated in a connector strip or in a control cabinet. The just-described central placement of the electronics in a connector strip or in a control cabinet thereby has the advantage that any number of plug-in connectors can be operated by means of one module. As described, for example, in the document EP 2 742 565 B1, corresponding diodes have to then be installed in the leads to each of the auxiliary contacts, so that a short circuit does not result between the various strands of several plug-in connectors, and only the current of the currently switching strand (or of the plug-in connector to be separated or to be connected, respectively) flows via the electronics.

Even though several plug-in connectors can be supplied in parallel by means of a single electronic module by means of the diodes described in the document EP 2 742 565 B1, this only works for unidirectional networks. It is a special feature of DC networks that energy flows can be bidirectional, such as, for example, in the case of accumulators (secondary cells), which can be source as well as consumer of the direct current. Electric machines can likewise operate as consumers of the direct current but can also feed back energy as a generator when braking. In the case of a bidirectional application, for example the change between an electric machine operated as a motor and as a generator, the described diode circuit does not work. A more complex switching of each individual auxiliary contact would need to be realized here with significant additional effort.

SUMMARY

In an embodiment, the present invention provides a plug-in contact device for preventing or extinguishing an arc when separating or closing a direct current connection, comprising: at least one plug-in connector each comprising a main contact, HA, and an auxiliary contact, HI, the HA comprising a first contact half, HA1, and a second contact half, HA2, which are configured to be releasably plugged together, wherein the HA is configured to: electrically conductively connect the HA1 and the HA2 in a plugged-together state of the respective plug-in connector, galvanically separate the HA1 and the HA2 in a released state of the respective plug-in connector, electrically conductively connect the HA1 and the HA2 in a first intermediate state of the respective plug-in connector between the plugged-together state and the released state, and galvanically separate the HA1 and the HA2 in a second intermediate state of the respective plug-in connector between the first intermediate state and the released state, wherein the auxiliary contact, HI, comprises a first contact half, HI1, and a second contact half, HI2, which are configured to be releasably plugged together, wherein the HI is configured to: galvanically separate the HI1 and the HI2 in the plugged-together state of the respective plug-in connector, galvanically separate the HI1 and the HI2 in the released state of the respective plug-in connector, electrically conductively connect the HI1 and the HI2 in the first intermediate state of the respective plug-in connector, and electrically conductively connect the HI1 and the HI2 in the second intermediate state of the respective plug-in connector, wherein the HA2 and the HI2 are electrically conductively connected, and wherein the plug-in contact device further comprises an electronic switching unit, a first terminal of which is electrically conductively connected to the HA1 and a second terminal of which is electrically conductively connected to the HI1, the electronic switching unit being configured to: in response to a transition from the plugged-together state into the first intermediate state, electrically conductively connect the first terminal and the second terminal or decrease an impedance between the first terminal and the second terminal, and in response to a transition from the first intermediate state into the second intermediate state and/or from the second intermediate state into the released state, electrically separate the first terminal and the second terminal or increase an impedance between the first terminal and the second terminal.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
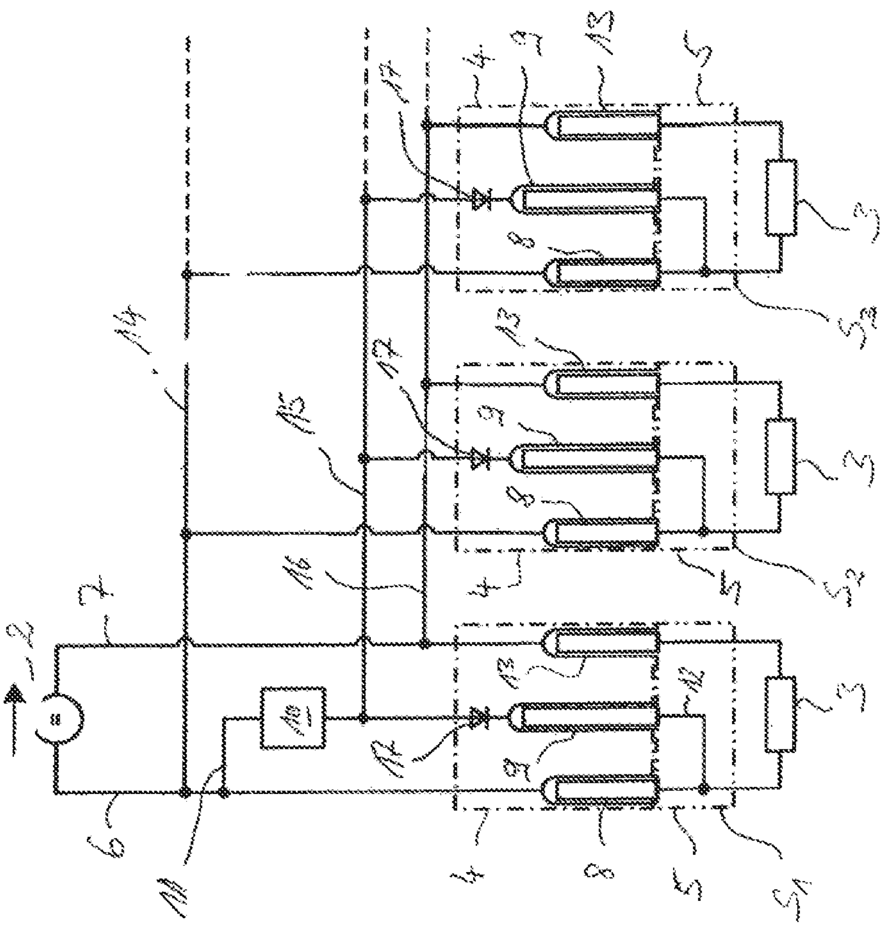
FIG. 1 shows a multiple plug-in connector system known from the prior art.

In an embodiment, the present invention provides a plug-in contact device for preventing or extinguishing an arc when separating or closing a direct current connection, which can be operated in a unidirectional as well as in a bidirectional network.

Exemplary embodiments of the invention are described below by partial reference to the figures.

According to one aspect, a plug-in contact device for preventing or extinguishing an arc when separating or closing a direct current connection is provided. The plug-in contact device comprises at least one plug-in connector, each comprising a main contact (HA) and an auxiliary contact (HI). The HA comprises a first contact half (HA1) and a second contact half (HA2), which can be releasably plugged together. The HA is configured to electrically conductively connect the HA1 and the HA2 in a plugged-together state (T0) of the respective plug-in connector. The HA is further configured to galvanically separate the HA1 and the HA2 in a released state (T3) of the respective plug-in connector. The HA is further configured to electrically conductively connect the HA1 and the HA2 in a first intermediate state (T1) of the respective plug-in connector between the plugged-together state (T0) and the released state (T3), and to galvanically separate the HA1 and the HA2 in a second intermediate state (T2) of the respective plug-in connector between the first intermediate state (T1) and the released state (T3). The auxiliary contact (HI) comprises a first contact half (HI1) and a second contact half (HI2), which can be releasably plugged together. In the plugged-together state (T0) of the respective plug-in connector, the HI is configured to galvanically separate the HI1 and the HI2. In the released state (T3) of the respective plug-in connector, the HI is further configured to galvanically separate the HI1 and the HI2. In the first intermediate state (T1) of the respective plug-in connector, the HI is furthermore configured to electrically conductively connect the HI1 and the HI2, and, in the second intermediate state (T2) of the respective plug-in connector, to electrically conductively connect the HI1 and the HI2. The HA2 and the HI2 are (preferably in each of the 4 states) electrically conductively connected. The plug-in contact device further comprises an electronic switching unit, the first terminal of which is electrically conductively connected to the HA1 and the second terminal of which is electrically conductively connected to the HI1 (preferably in each of the 4 states). The electronic switching unit is configured, in response to a transition from the plugged-together state (T0) into the first intermediate state (T1), to electrically conductively connect the first terminal and the second terminal or to decrease an impedance between the first terminal and the second terminal and, in response to a transition from the first intermediate state (T1) into the second intermediate state (T2) and/or from the second intermediate state (T2) into the released state (T3), to electrically separate the first terminal and the second terminal or to increase an impedance between the first terminal and the second terminal.

In one exemplary embodiment of the plug-in contact device, the HA, in the plugged-together state, can electrically conductively connect the HA1 and the HA2, while in the plugged-together state, the HI can galvanically separate the HI1 and the HI2. In the released state, the HA1 and the HA2 as well as the HI1 and the HI2 can in each case be galvanically separated. In the first intermediate state between T0 and T3, the HA1 and the HA2 as well as the HI1 and the HI2 can in each case be electrically conductively connected. In the second intermediate state between T1 and T3, the HA1 and the HA2 can be galvanically separated, while the HA2 and the HI2 can be electrically conductively connected.

Exemplary embodiments can provide for a plug-in contact device, which forgoes diodes on auxiliary contacts. In order to be able to forego the diode, it is provided that, in the plugged-together state, the contact halves (HI1 and HI2) of the auxiliary contact (HI) are galvanically separated, for example by means of a partially insulated pin contact as HI1 or HI2.

For example, the HI is designed so that, in the plugged-together state (for example a completely plugged state) no conductive connection exists between HI1 and HI2 (for example pin contact and socket contact). The circuit is closed via the electronic switching unit (in short: electronics) only when separating the direct current connection (i.e. a transition in the direction of the released state), preferably during the transition into the first intermediate state. This preferably takes place before the arc is created or would be created, respectively, without HI on the leading main contact (HA, also: load contact), for example during the transition into the second intermediate state. The arc then triggers the electronic switching unit (in short: electronics), for example due to a voltage drop between the first and second terminal, whereupon the current is conducted via the auxiliary contact (HI) and the electronics. The electronics then directly interrupts the circuit (for example after a period of time, which is shorter than a typical period of time of the transition from the second intermediate state to the released state) and thus provides for a load-free separating of the electrical connection (and/or load-free opening of the HI) without arc. An exemplary mode of operation of the electronics is described in the publication EP 2 742 565 B 1.

In the case of a plug-in contact device comprising several plug-in connectors, which are also referred to as strands, exemplary embodiments of the plug-in contact device can accomplish the separation of the individual strands from one another by means of the electrical (preferably physical or galvanic) separation of the respective auxiliary contacts (HI) of the plug-in contact device in the plugged-together state.

A state of galvanic separation can also be referred to as open state here. A state of electrically conductive connection can also be referred to as closed state.

In addition to the main contact (HA) and the auxiliary contact (HI), which can also be referred to as control contact, the at least one plug-in connector can comprise a opposite pole contact (GE), which can also be referred to as second main contact, and/or a ground contact (PE, "physical earth"). The GE and/or the PE can each comprise a first contact half and a second contact half.

The main contact (HA) can be connected or connectable to the positive pole of a direct current source. The opposite pole contact (GE) can be connected or connectable to the negative pole of a direct current source. In the plugged-together state (T0), in the first intermediate state (T1), and in the second intermediate state (T2), the GE and/or the PE can be electrically conductively connected and can be galvanically separated in the released state (T3).

The electronic switching unit can comprise at least one semiconductor switch. The electronic switching unit can be connected in series with the HI of the at least one plug-in connector. The HI can optionally be connected parallel to the HA by means of the electronic switching unit. The electronic switching unit can also be referred to as extinguishing electronics.

The electronic switching unit can further be configured, in response to a transition from the released state (T3) into the second intermediate state (T2) and/or from the second intermediate state (T2) into the first intermediate state (T1), to electrically conductively connect the first terminal and the second terminal or to decrease an impedance between the first terminal and the second terminal, and, in response to a transition from the first intermediate state (T1) into the plugged-together state (T0), to electrically separate the first terminal and the second terminal or to increase an impedance between the first terminal and the second terminal.

The electronic switching unit can be configured to electrically conductively connect the first terminal and the second terminal for a bidirectional current flow or for both current directions. A bidirectional current flow can be ensured by means of a rectifier.

The at least one plug-in connector can each comprise a first plug-in connector half and a second plug-in connector half. The first plug-in connector half can comprise the HA1 and the HI1. The first plug-in connector half can further comprise a first contact half GE1 of the GE and optionally a first contact half PE1 of the PE. The second plug-in connector half can comprise the HA2 and the HI2. The second plug-in connector half can further comprise a second contact half GE2 of the GE and optionally a second contact half PE2 of the PE. The first plug-in connector half can also be referred to as socket. The second plug-in connector half can also be referred to as power plug.

In the plugged-together state, the first plug-in connector half and the second plug-in connector half of the respective plug-in connector can be mechanically connected. In the released state, the first plug-in connector half and the second plug-in connector half of the respective plug-in connector can be spatially separated.

Each plug-in connector half can comprise a housing.

One pole of a direct current source of the direct current connection, preferably a positive pole of the direct current source, can be electrically conductively connected or connectable to the HA1 of the main contact and/or the first terminal of the electronic switching unit, wherein one pole of an electrical consumer, preferably a positive pole of the consumer, is electrically conductively connected or connectable to the HA2 of the main contact and/or of the HI2 of the auxiliary contact. Alternatively or additionally, one pole of a direct current source of the direct current connection, preferably a positive pole of the direct current source, can be electrically conductively connected or connectable to the HA2 of the main contact and/or the HI2 of the auxiliary contact, wherein one pole of an electrical consumer, preferably a positive pole of the consumer, can be electrically conductively connected or connectable to the HA1 of the main contact and/or the first terminal of the electronic switching unit.

For example, the direct current source can comprise a rechargeable electrical energy storage (preferably secondary cells), and the electrical consumer can comprise an electric machine (e-machine). The e-machine can be operated as a generator (preferably temporarily), wherein the current direction of the direct current (preferably for a recuperation) reverses through the plug-in contact device.

The HA1 can comprise a pin contact and the HA2 a socket contact. Alternatively, the HA2 can comprise a pin contact and the HA1 a socket contact. Alternatively or additionally, the HI1 can comprise a pin contact and the HI2 a socket contact. In a further alternative or additionally to the HA, the HI2 can comprise a pin contact and the HI1 a socket contact. The first contact half (GE1) of the opposite pole contact (GE) can comprise a pin contact and the second contact half (GE2) of the GE a socket contact. Alternatively, the GE2 can comprise a pin contact and the GE1 a socket contact. The first contact half (PE1) of the ground contact (PE or "physical earth") can comprise a pin contact and the second contact half (PE2) of the PE a socket contact. Alternatively, the PE2 can comprise a pin contact and the PE1 a socket contact.

An outer profile of the pin contact and/or an inner profile of the socket contact of the HA and/or an outer profile of the pin contact and/or an inner profile of the socket contact of the HI of the respective plug-in connector can have a round, oval, or polygonal cross-section. Alternatively or additionally, the HA and the HI of the respective plug-in connector can be hermaphroditic.

The HA and the HI can each have a longitudinal axis. The HA1 and the HA2 as well as the HI1 and the HI2 can each be capable of being plugged together and released along their longitudinal axis. The longitudinal axis of the HA and the longitudinal axis of the HI can be parallel to one another. Alternatively or additionally, the HA1 and the HA2 and/or the HI1 and the HI2 can each be capable of being plugged together and released along a transverse axis, which is transverse or perpendicular to the longitudinal axis.

An extent of the (load-side) HI2 or (direct current source-side) HI1 of the HI with respect to a contact point of the (direct current-side) HI1 or (load-side) HI2, respectively, which is assigned to the (load-side) HI2 or (direct current-side) HI1 of the respective HI, may be longer than an extent of the (load-side) HA2 or (direct current-side) HA1 of the HA with respect to a contact point of the (direct current-side) HA1 or (load-side) HA2, respectively, which is assigned to the (load-side) HA2 or (direct current-side) HA1 of the respective HA. The respective extent along the longitudinal axis in the direction of the plugging together can be determined in the plugged-together state. A load-side contact half can be determined by means of the electrically conductive connection of HA2 and HI2. A direct current-side contact half can be determined by means of the series connection of HI1 to the electronic switching unit and the electrically conductive connection thereof to the HAL For example, the load-side HA2 and HI2 can each comprise pin contacts. Starting at the contact point of the respective socket contact HA1 or HI1, respectively (for example as zero point), the extent of the pin contacts can comprise a length of the respective pin contact in the (direct current-side) plug-in direction in the plugged-together state. The pin contact of the HA can be shorter than the pin contact of the HI.

The HI2 or the HI1 of the HI of the at least one plug-in connector plug-in connector can comprise a separating section. In the plugged-together state, the separating section can comprise a separating section. In the plugged-together state (T0) of the respective plug-in connector, the separating section can effect a galvanic separation from the contact point of the HI1 or the HI2, which is assigned to the HI2 or the HI1 of the HI.

An extent of the separating section of the HI2 or of the HI1 can comprise an insulation, which is circumferential along a partial extent of the HI2 or HI1, respectively. The partial extent of the HI2 or HI1, respectively, can be shorter than the extent of the HA2 or of the HA1 of the HA with respect to a contact point of the HA1 or HA2, respectively, which is assigned to the HA2 or the HA1 of the respective HA. The respective extent along the longitudinal axis can be determined in the direction of the plugging together in the plugged-together state. For example, the HI2 can comprise a pin contact comprising a circumferential insulation as separating section. The separating section can comprise an outer partial length (viewed from the plugged-together direction) of the pin contact.

The HA1 or the HA2 of the HA can have only one contact point along the longitudinal axis. Alternatively or additionally, the HI1 or the HI2 of the HI can have only one contact point along the longitudinal axis.

The electronic switching unit can comprise at least one semiconductor switch, which, when an electrical voltage is applied between the first terminal and the second terminal, is configured to decrease the impedance between the first terminal and the second terminal or to electrically conductively connect the first terminal and the second terminal.

The electronic switching unit can be configured for the bidirectional current flow between the first terminal and the second terminal. For the bidirectional current flow, the electronic switching unit can preferably comprise a rectifier bridge. The electronic switching unit can comprise a rectifier bridge, which is linked to the at least one semiconductor switch. For example, a rectifier bridge is linked to one or several semiconductor switches, which optionally electrically conductively connect and separate the first terminal and the second terminal, or which optionally increase and decrease the impedance between the first terminal and the second terminal, respectively. Two opposite terminals of the rectifier bridge can comprise the first terminal and the second terminal of the electronic switching unit. Two further opposite terminals of the rectifier bridge can be connected or connectable to one another via a semiconductor switch and/or an RC member and/or a capacitor and/or a varistor and/or a thermistor.

The electronic switching unit can further comprise two semiconductor switches, which are connected to one another in series in mutually opposite direction and to which a diode is in each case connected in parallel in the reverse direction. The diode, which is in each case connected in parallel, can act as bypass in the reverse direction of the semiconductor switch. The electronic switching unit can optionally further comprise a trigger circuit, which is configured to effect a closing of a semiconductor switch when the electrical voltage is applied between the first terminal and the second terminal. The trigger circuit can further optionally comprise the rectifier bridge.

Alternatively or additionally, the electronic switching unit can comprise a metal oxide semiconductor field effect transistor (MOSFET) and/or an insulated-gate bipolar transistor (IGBT) and/or an RC member comprising a capacitor and a changeable resistor, for example a varistor and/or a thermistor.

The plug-in contact device can comprise at least two plug-in connectors, each comprising an HA and an HI and an electronic switching unit. The first terminal of the electronic switching unit can be electrically conductively connected to the HA1 of each HA. The second terminal of the electronic switching unit can be electrically conductively connected to the HI1 of each HI. The respective first plug-in connector halves of the at least two plug-in connectors can be connected to the same direct current source and/or can be connected in parallel.

The at least one plug-in connector can further comprise an opposite pole contact (GE) comprising a first contact half (GE1) and a second contact half (GE2), for an opposite pole of the direct current connection with respect to the HA, preferably wherein, in the plugged-together state (T0) of the respective plug-in connector, in the first intermediate state (T1) of the respective plug-in connector and in the second intermediate state (T2) of the respective plug-in connector, the GE is configured to electrically conductively connect the GE1 and the GE2. The contact halves GE1 or GE2 can be longer than the contact halves HA1 or HA2 of the HA. The contact half GE1 or GE2 of the GE can in particular have the same length as a contact half HI1 or HI2 of the HI.

FIG. 1 shows, schematically, a mechatronic multiple plug-in connector system known from the document EP 2 742 565 B1. The multiple plug-in connector system comprises at least two plug-in connectors S1, S2 . . . , which in each case have a main contact 8 comprising a main plug-in contact and comprising a main counter contact, as well as in each case an auxiliary contact 9 trailing the main contact 8 during an unplugging process comprising an auxiliary plug-in contact and comprising an auxiliary counter contact. To extinguish an arc resulting in the course of an unplugging process, the multiple plug-in connector system of the document EP 2 742 565 B1 further comprises a single semiconductor electronics 10, which the plug-in connectors S1, S2 . . . have in common and which is connected in series by means of the auxiliary contact 9 of each plug-in connector S1, S2 . . . via a diode 17 to prevent a short-circuit, for example of the plug-in connectors S2 and S3, in the course of an unplugging process of one or several individual plug-in connectors, for example S1, and wherein the semiconductor electronics 10 has two semiconductor switches, which are connected in series, and one energy storage connected to the semiconductor switches, which taps the arc voltage between the semiconductor switches resulting as part of the unplugging process for charging purposes.

Figure 2:
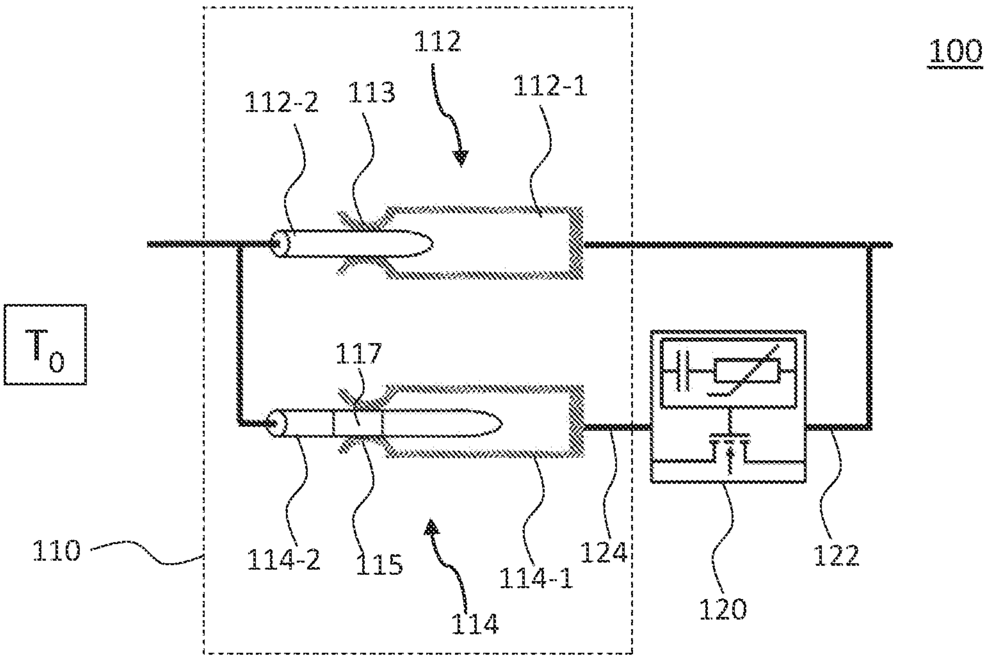
FIG. 2 shows an exemplary embodiment of a plug-in contact device comprising a main contact and an auxiliary contact comprising an electronic switching unit.

FIG. 2 shows an exemplary embodiment of a plug-in contact device, which is generally identified with reference numeral 100, for preventing or extinguishing an arc when separating or closing a direct current connection. The plug-in contact device 100 comprises a plug-in connector, which is generally identified with reference numeral 110, comprising a main contact (HA) 112 comprising a first contact half (HA1) 112-1 configured as socket contact, and a second contact half (HA2) 112-2 configured as pin contact. The plug-in connector 110 further comprises an auxiliary contact (HI) 114 comprising a first contact half (HI1) 114-1 configured as socket connection and a second contact half (HI2) 114-2 configured as pin contact. The HA2 112-2 and HI2 114-2 are electrically conductively connected. An electronic switching unit 120 is connected in parallel to the socket contact (HA1) 112-1 via a first terminal 122. The HI 114 is connected in series to the electronic switching unit 120 via a second terminal 124. In FIG. 2, the plug-in contact device 100 is shown in the plugged-together state TO, in which the pin contact (HA2) 112-2 is electrically conductively connected to the socket contact (HA1) 112-1 via the contact point 113. In the plugged-together state TO shown in FIG. 2, the pin contact (HI2) 114-2 is galvanically separated from the contact point 115 of the socket contact (HI1) 114-1 by means of a separating section 117, which comprises a circumferential insulation.

The electronic switching unit 120 in FIG. 2 comprises an RC member ("resistor capacitor"). The RC member can be configured as metal oxide semiconductor field effect transistor (MOSFET) or insulated-gate bipolar transistor (IGBT). Alternatively or additionally, several RC members, for example an IGBT and a MOSFET, can also be connected in series. The electronic switching unit optionally further comprises a rectifier bridge, which provides for a bidirectional current flow in the direct current system. By means of a reversal of the current direction, for example braking energy of an electric machine, which is operated as generator, can be recuperated.

Figure 3:
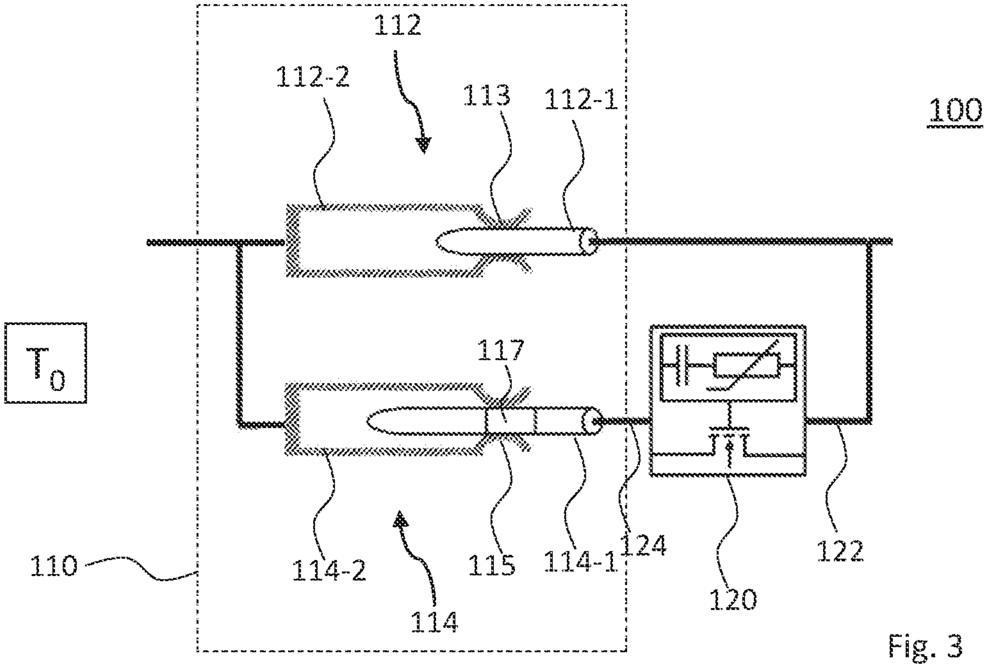
FIG. 3 shows a second exemplary embodiment of a plug-in contact device comprising a main contact and an auxiliary contact comprising an electronic switching unit.

FIG. 3 shows a second exemplary embodiment of a plug-in contact device, which is generally identified with reference numeral 100, for preventing or extinguishing an arc when separating or closing a direct current connection in the plugged-together state TO. Identical components of the plug-in contact device as in FIG. 2 are identified with the same reference numerals. The plug-in connector in FIG. 3, which is generally identified with reference numeral 110, comprises an assignment, which is reversed compared to FIG. 2, of pin contacts and socket contacts to the first and second contact halves of the HA and of the HI.

In a third exemplary embodiment (without figure), the plug-in connector, which is generally identified with reference numeral 110, is configured hermaphroditically. In a first variation of a hermaphroditic plug-in connector 110, the HA1 112-1 comprises a socket contact as shown in FIG. 2, and the HI1 114-1 comprises a pin contact as shown in FIG. 3. In a second variation of a hermaphroditic plug-in connector 110, the HA1 112-1 comprises a pin contact as shown in FIG. 3 and the HI1 114-1 comprises a socket contact as shown in FIG. 2.

Figure 4A:
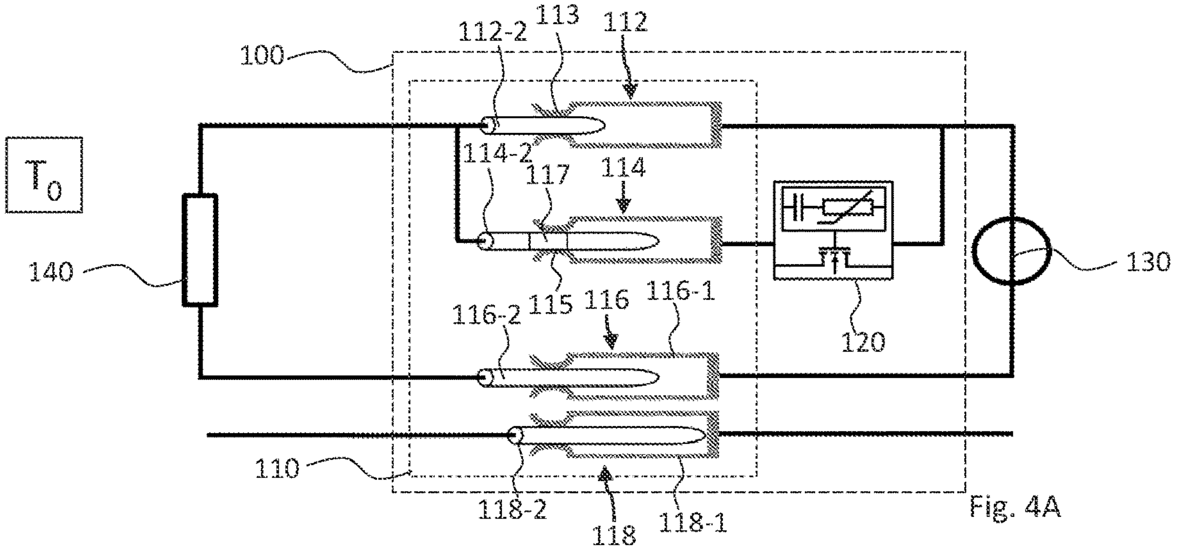
FIG. 4A to 4C show an exemplary separating process of an exemplary embodiment of the plug-in contact device.
Figure 4B:
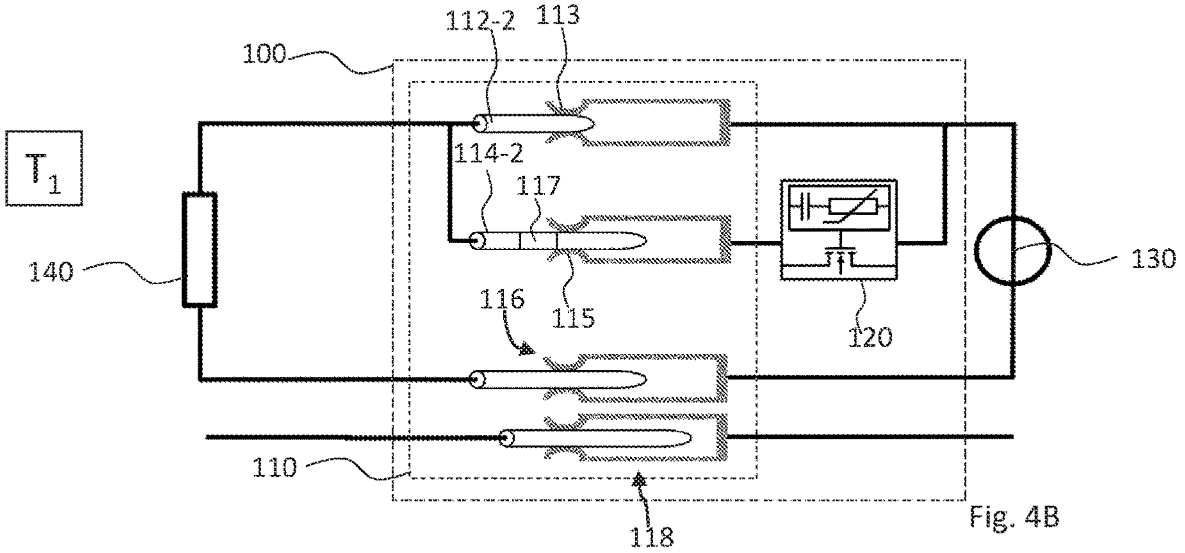
Figure 4C:
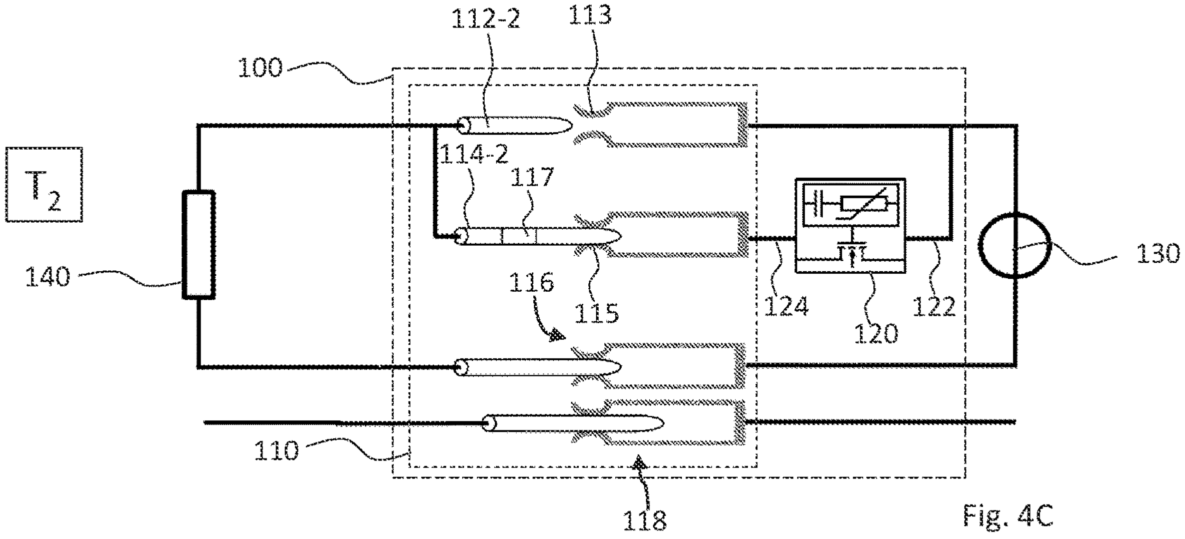

FIG. 4A to FIG. 4C in each case show a plug-in contact device 100, the plug-in connector 110 of which comprises an HA 112, an HI 114, an opposite pole contact (GE) 116, and a ground contact (PE) 118. As shown in FIG. 2, the HI 112 is connected in series with an electronic switching unit 120. The first contact halves HA1 of the HA 112 and HI1 of the HI 114 are connected or connectable to a pole, preferably the positive pole, of a direct current source 130, wherein the HI 114 is connected in series with an electronic switching unit 120, which is electrically conductively connected to the HA 112. The first contact half GE1 116-1 of the opposite pole contact (GE) 116 is connected or connectable to a second pole, preferably the negative pole, of the direct current source 130. The plug-in connector 110 in FIGS. 4A to 4C further comprises a ground contact (PE) 118 to first contact half (PE1) 118-1 and second contact half (PE2) 118-2. The second contact halves HA2 112-2, HI2 114-2, and GE2 116-2 are connected to a load 140.

FIG. 4A shows the plug-in contact device 100 in the plugged-together state T0. The contacts HA 112, GE 116 and PE 118 are electrically conductively connected. The contact HI 114 is galvanically separated by means of the separating section 117, for example a circumferential insulation. The positive pole side of the plug-in contact device 100 in FIG. 4A corresponds to that in FIG. 2.

FIG. 4B shows the plug-in contact device 100 in the first intermediate state T1, for example when separating the direct current connection, wherein the der plug-in connector 110 is no longer completely plugged together. The HA2 112-2 is furthermore electrically conductively connected to the HA1 112-1 via the contact point 113. The HI2 114-2 is now conductively connected to the HI1 114-1 via the contact point 115. In the first intermediate state T1, the electronic switching unit 120 is passive. In the first intermediate state T1, the resistor of the RC member of the electronic switching unit 120 can in particular be of high impedance.

FIG. 4C shows the plug-in contact device 100 in the second intermediate state T2, in which the plug-in connector 110 is not completely separated yet. The HA 112 is now galvanically separated in that the HA2 112-2 is spatially separated from the contact point 113. An arc is created between the HA2 112-2 and the contact point 113 of the HA1 112-1. The electronic switching unit 120 is activated via the first terminal 122. The activation has the effect that the electronic switching unit 120 (or its RC member) becomes conductive. In the second intermediate state T2 the RC member can in particular be of low impedance. The HI 114 is further conductively connected via the contact point 115. The direct current now flows from the direct current source 130 via the electronic switching unit 120 and the HI 114. The electronic switching unit 120 preferably comprises a timing element, which has the effect that the current flow via the HI 114 is interrupted after a predetermined period of time. The interruption of the current flow can take place prior to a galvanic separation of the HI 114, GE 116, and PE 118.

In an optional (non-illustrated) third intermediate state, the contacts HA 112, HI 114, and GE 116 are galvanically separated, while the ground contact PE 118 is still electrically conductively connected. In the (non-illustrated) state T3, all contacts HA 112, HI 114, GE 116, and PE 118 are galvanically separated. In the released state T3, the two contact halves 110-1 and 110-2 of the plug-in connector 110 can be spatially separated.

Figure 5:
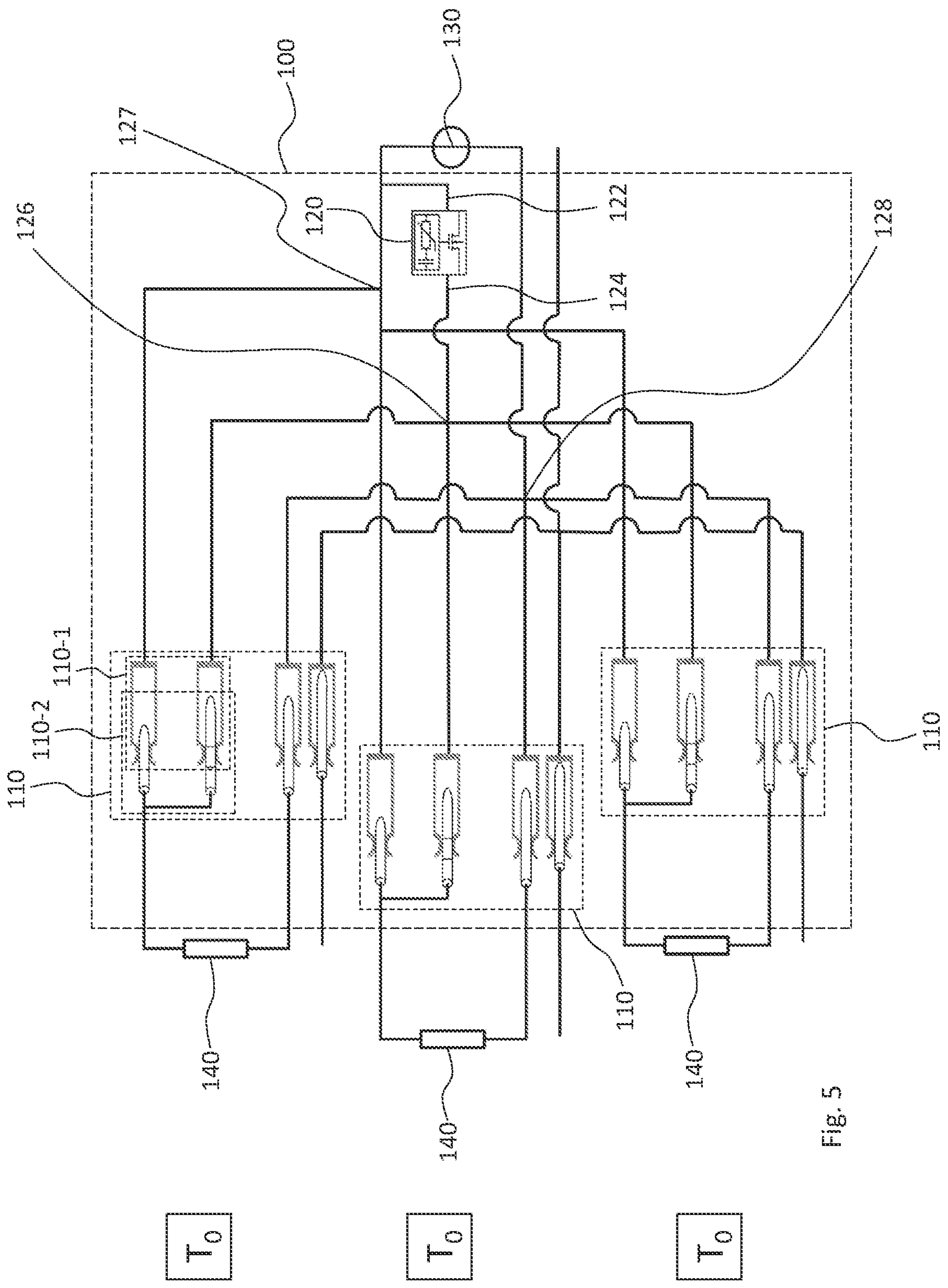
FIG. 5 shows a third exemplary embodiment of the plug-in contact device as exemplary multiple plug-in connector system.

FIG. 5 shows a plug-in contact device 100 comprising three plug-in connectors 110. Each plug-in connector 110 is of the same construction as the plug-in connector 110 according to FIG. 4A and is illustrated in the plugged-together state TO. In the plugged-together state TO, each HI 114 is galvanically separated by means of the separating section 117. On the side of the direct current source 130, the HI 114 of all plug-in connectors 110 are connected in parallel at the point 126, so that all HI 114 are electrically conductively connected to only one (common) electronic switching unit 120 via the second terminal 124. The (common) electronic switching unit 120 is electrically conductively connected to the HA 112, which is connected in parallel at the point 127, of all plug-in connectors 110. The GE 118 of all plug-in connectors 110 are connected in parallel at the point 128.

If a first one of the plug-in connectors 110 is separated, the corresponding HI 114 is transferred into the conductive first and second intermediate states T1 and T2 and a connection to the electronic switching unit 120 is established, as described with reference to FIG. 4A to 4C. The plug-in connector 110 in the other (plugged-together) strands are not affected by the separation of the first plug-in connector 110 and the resulting arc in the corresponding HA 112 as well as current flow in the corresponding HI 114 because their respective HI 114 are still galvanically separated from the (common) electronic switching unit 120. There is thus no short-circuit between different strands during normal operation. As in the patent by ETA, there is still a problem analogously to the problem described in the patent specification EP 2 742 565 B1 only when more than one plug-in connector 110 can be separated simultaneously. If two (or more) plug-in connectors 110 are pulled simultaneously, a short-circuit can occur between these two (or more) strands.

The exemplary embodiments of FIG. 4A to 4C and FIG. 5 have socket contacts as HA1 112-1, HI1 114-1, GE1 116-1, and PE1 118-1, and pin contacts as HA2 112-2, HI 112-2, GE2 116-2, and PE2 118-2. Further (non-illustrated) exemplary embodiments correspond to the swapping of pin contacts and socket contacts as in FIG. 3. Any hermaphroditic combinations of the plug-in connector halves are further possible.

Further components, in particular diodes, in or on the first contact half HI1 114-1 can be prevented by means of the plug-in contact device 100, in particular by means of the separating section 117 of the auxiliary contact HI 114.

The multiple plug-in connector system (shown, for example, in the exemplary embodiment of FIG. 5) can be scaled up to building installation level. The electronic switching unit (for example the switching unit 120) is therefore not integrated into a multiple plug-in connector system but, for example, centrally into a sub-distribution of a room or of a floor. The described auxiliary contact (for example HI 114) thus has to be connected to the electronic switching unit (for example switching unit 120) via an additional line. Due to the fact that this is not a control line or signal line, this connection can also be referred to as X conductor.

Figure 6A:
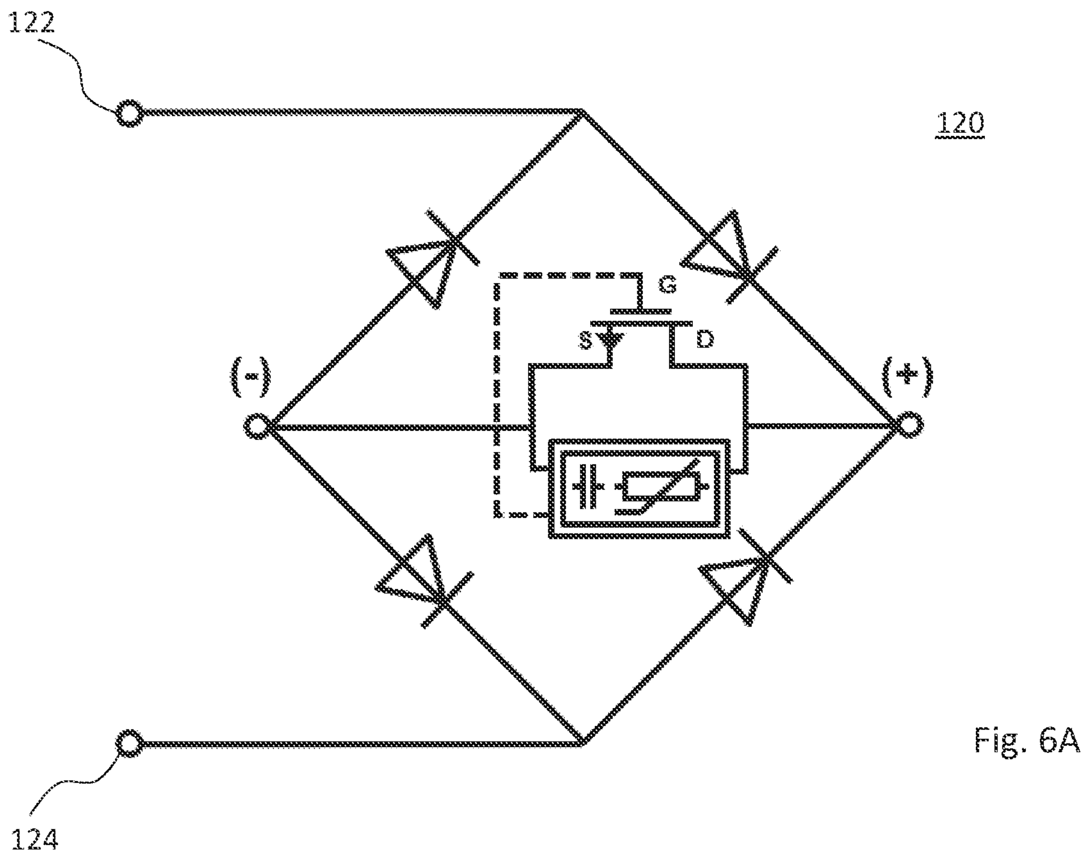
FIGS. 6A and 6B show two exemplary embodiments of a bidirectional electronic switching unit.
Figure 6B:
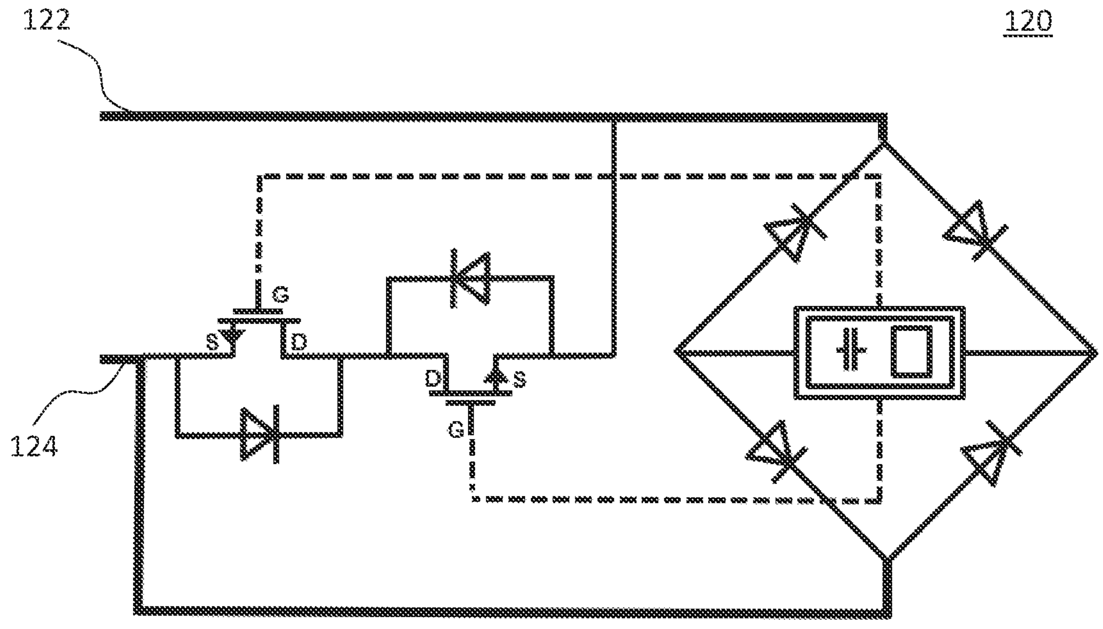

FIGS. 6A and 6B show two exemplary embodiments of a bidirectional electronic switching unit 120, which comprises a rectifier bridge. The rectifier bridge can be connected to the HA1 112-1 via a first terminal 122 and to the HI1 114-1 via a second terminal 124, 224.

In the exemplary embodiment shown in FIG. 6A, the two further (inner) terminals of the rectifier bridge are connected to one another via a parallel connection of a semiconductor switch and of an RC member with variable resistance, wherein the impedance of the semiconductor switch can be changed by means of a control signal (drawn by means of dashes). Independently of a polarity applied on the outside (on the first and second terminal), a specific polarity on the (two further) inner terminals is ensured via the diodes of the rectifier bridge, and a bidirectional current flow through the HA 112 and the HI 114 is made possible.

In the exemplary embodiment shown in 6B, the electronic switching unit 120 comprises a polarity reversal protection, which comprises two semiconductor switches, which are connected to one another in series in the opposite direction, and in each case a diode, which is connected in parallel in the reverse direction (on the left in FIG. 6B). The diode, which is in each case connected in parallel, acts as bypass in the reverse direction of the semiconductor switch. In FIG. 6B, the electronic switching unit 120 further comprises a trigger circuit, which connects the two further (inner) terminals of the rectifier bridge (on the right in FIG. 6B). The trigger circuit changes (e.g. decreases) the impedance of one or of both semiconductor switches, which are connected in series, by means of control signals (illustrated by means of dashes), independently of a polarity applied on the outside. In the alternative, a unipolar semiconductor switch can also be used.

To extend the lead to the electronic switching unit (for example switching unit 120) is perhaps possible for someone with a technical background and, on its own, does not represent a technical novelty. However, in the prior art, for example in the patent specification EP 2 742 565 B1, every plug-in connector (for example consisting of direct current-side socket unit 4 and load-side plug unit 5) has to be equipped with a diode 7, either in the plug-in connector or at least somewhere in the auxiliary line (which is configured as control line). In the plug-in contact device 100 according to the invention, these diodes are replaced by a safe galvanic separation in the auxiliary contacts (for example the HI 114). For this purpose, the auxiliary contact (for example HI 114) has an (insulating) separating section 117, which, in the plugged-together state, separates the metallic contact partners of pin contact and socket contact from one another. The design in the form of round pin and round socket is thereby only exemplary. An insulator of this type can also be used in the case of hermaphroditic contacts or in the case of flat contacts. Due to the fact that in the plugged-together state, the auxiliary contacts (for example HI 114) of all plug-in connectors (for example plug-in connectors 110) are in the rest position on the respective (insulated) separating section 117 of the auxiliary contacts, a short-circuit between different plug-in connectors can thus also not result. A conductive connection to the electronic switching unit (for example the switching unit 120) is established only during the separating process of a plug-in connector.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

DC source 2
Load 3
Socket unit 4

Plug unit 5
Forward-feed conductor 6
Return conductor 7
Main contact 8
Auxiliary contact 9
Electronics 10
Bypass or bypass line 11, 12
Third contact 13
Line 14, 15, 16
Diode 17
Plug-in contact device 100
Plug-in connector 110
First plug-in connector half 110-1
Second plug-in connector half 110-2
Main contact 112
First contact half of the main contact 112-1
Second contact half of the main contact 112-2
Contact point of the main contact 113
Auxiliary contact 114
First contact half of the auxiliary contact 114-1
Second contact half of the auxiliary contact 114-2
Contact point of the auxiliary contact 115
Opposite pole contact 116
First contact half of the opposite pole contact 116-1
Second contact half of the opposite pole contact 116-2
Separating section 117
Ground contact 118
First contact half of the ground contact 118-1
Second contact half of the ground contact 118-2
Electronic switching unit 120
First terminal 122
Second terminal 124
Parallel connection of auxiliary contacts 126
Parallel connection of main contacts 127
Parallel connection of opposite pole contacts 128
Direct current source 130
Load 140
Plugged-together state T0
First intermediate state T1
Second intermediate state T2

The invention claimed is:

1. A plug-in contact device for preventing or extinguishing an arc when separating or closing a direct current connection, comprising:

at least one plug-in connector each comprising a main contact and an auxiliary contact, the main contact comprising a first contact half and a second contact half, which are configured to be releasably plugged together, wherein the main contact is configured to:

electrically conductively connect the first half contact and the second half contact in a plugged-together state of the respective plug-in connector, galvanically separate the first half contact and the second half contact in a released state of the respective plug-in connector, electrically conductively connect the first half contact and the second half contact in a first intermediate state of the respective plug-in connector between the plugged-together state and the released state and galvanically separate the first half contact and the second half contact in a second intermediate state of the respective plug-in connector between the first intermediate state and the released state, wherein the auxiliary contact comprises a first contact half and a second contact half which are configured to be releasably plugged together, wherein the auxiliary contact is configured to:

galvanically separate the first contact half and the second contact half in the plugged-together state of the respective plug-in connector, galvanically separate the first contact half and the second contact half in the released state of the respective plug-in connector, electrically conductively connect the first contact half and the second contact half in the first intermediate state of the respective plug-in connector, and electrically conductively connect the first contact half and the second contact half in the second intermediate state of the respective plug-in connector, wherein the second half contact and the second contact half are electrically conductively connected; and wherein the plug-in contact device further comprises an electronic switching unit, a first terminal of which is electrically conductively connected to the first half contact and a second terminal of which is electrically conductively connected to the first contact half, the electronic switching unit being configured to:

in response to a transition from the plugged-together state into the first intermediate state, electrically conductively connect the first terminal and the second terminal or decrease an impedance between the first terminal and the second terminal and in response to a transition from the first intermediate state into the second intermediate state and/or from the second intermediate state into the released state, electrically separate the first terminal and the second terminal or increase an impedance between the first terminal and the second terminal.

2. The plug-in contact device of claim 1, wherein the electronic switching unit is configured to:

in response to a transition from the released state into the second intermediate state and/or from the second intermediate state into the first intermediate state, electrically conductively connect the first terminal and the second terminal or decrease an impedance between the first terminal and the second terminal, and in response to a transition from the first intermediate state into the plugged-together state, electrically separate the first terminal and the second terminal or increase an impedance between the first terminal and the second terminal.

3. The plug-in contact device of claim 1, wherein the at least one plug-in connector each comprises a first plug-in connector half and a second plug-in connector half, and wherein the first plug-in connector half comprises the first half contact and the first contact half and the second plug-in connector half comprises the second half contact and the second contact half.

4. The plug-in contact device of claim 1, wherein one pole of a direct current source of the direct current connection, is electrically conductively connected or connectable to the first half contact of the main contact and/or the first terminal of the electronic switching unit, and wherein one pole of an electrical consumer is electrically conductively connected or connectable to the second half contact of the main contact and/or of the second contact half of the auxiliary contact and/or wherein one pole of a direct current source of the direct current connection is electrically conductively connected or connectable to the Hecond half contact of the main contact and/or the HI2second contact half of the auxiliary contact, and wherein one pole of an electrical consumer is electrically conductively connected or connectable to the first half contact of the main contact and/or the first terminal of the electronic switching unit.

5. The plug-in contact device of claim 1, wherein the first half contact comprises a pin contact and the second half contact a socket contact, or wherein the second half contact comprises a pin contact and the first half contact a socket contact and/or wherein the first contact half comprises a pin contact and the second contact half a socket contact, or wherein the second contact half comprises a pin contact and the first contact half a socket contact.

6. The plug-in contact device of claim 5, wherein an outer profile of the pin contact and/or an inner profile of the socket contact of the main contact and/or an outer profile of the pin contact and/or an inner profile of the socket contact of the auxiliary contact of the respective plug-in connector has a round, oval, or polygonal cross-section, and/or wherein the main contact and the auxiliary contact of the respective plug-in connector are hermaphroditic.

7. The plug-in contact device of claim 1, wherein the HAmain contact and the auxiliary contact each have a longitudinal axis, and wherein the first half contact and the second half contact and the first contact half and the second contact half are each configured to be plugged together and released along their longitudinal axis, or wherein the first half contact and the second half contact and/or the first contact half and the second contact half are each capable of being plugged together and released along a transverse axis, which is transverse or perpendicular to the longitudinal axis.

8. The plug-in contact device of claim 7, wherein an extent of the second contact half or of the first contact half of the auxiliary contact with respect to a contact point of the first contact half or second contact half, respectively, which is assigned to the second contact half or the first contact half of the respective auxiliary contact, is longer than an extent of the second half contact or of the HA1first half contact of the of main contact with respect to a contact point of the Hfirst half contact or second half contact, respectively, which is assigned to the second half contact or to the first half contact of the respective main contact, and wherein the respective extent along the longitudinal axis in a direction of the plugging together is determined in the plugged-together state.

9. The plug-in contact device of claim 7, wherein the second contact half or the first contact half of the HIauxiliary contact of the at least one plug-in connector comprises a separating section, and wherein, in the plugged-together state of the respective plug-in connector, the separating section provides a galvanic separation from the contact point of the first contact half or the second contact half, which is assigned to the second contact half or to the first contact half of the HIauxiliary contact.

10. The plug-in contact device of claim 9, wherein an extent of the separating section of the second contact half or of the first contact half has an insulation, which is circumferential along a partial extent of the second contact half or first contact half, respectively, and wherein the partial extent of the second contact half or first contact half, respectively, is shorter than the extent of the second half contact or of the first half contact of the main contact with respect to a contact point of the first half contact or second half contact, respectively, which is assigned to the second half contact or to the first half contact of the respective HAmain contact, and wherein a respective extent along the longitudinal axis is determined in a direction of the plugging together in the plugged-together state.

11. The plug-in contact device of claim 7, wherein the HA1first half contact or the second half contact of the main contact has only one contact point along the longitudinal axis and/or the first contact half or the second contact half of the HI has only one contact point along the longitudinal axis.

12. The plug-in contact device of claim 1, wherein the electronic switching unit is configured for bidirectional current flow between the first terminal and the second terminal.

13. The plug-in contact device of claim 1, wherein the electronic switching unit comprises at least one semiconductor switch, which, when an electrical voltage is applied between the first terminal and the second terminal, is configured to decrease an impedance between the first terminal and the second terminal or to electrically conductively connect the first terminal and the second terminal.

14. The plug-in contact device of claim 12, wherein the electronic switching unit comprises a rectifier bridge, which is linked to the at least one semiconductor switch.

15. The plug-in contact device of claim 13, wherein the electronic switching unit comprises two semiconductor switches, which are connected to one another in series in mutually opposite direction and to which a diode is in each case connected in parallel in the reverse direction.

16. The plug-in contact device of claim 1, wherein the plug-in contact device comprises at least two plug-in connectors, each comprising the main contact and the auxiliary contact and an electronic switching unit, and wherein the first terminal of the electronic switching unit is electrically conductively connected to the first half contact of each main contact and the second terminal of the electronic switching unit is electrically conductively connected to the first contact half of each auxiliary contact.

17. The plug-in contact device of claim 1, wherein the at least one plug-in connector comprises an opposite pole contact comprising a first pole contact half and a second pole contact half for an opposite pole of the direct current connection with respect to the main contact.

18. The plug-in contact device of claim 4, wherein the one pole of a direct current source of the direct current connection comprises a positive pole of the direct current source, and wherein the one pole of an electrical consumer comprises a positive pole of the consumer.

19. The plug-in contact device of claim 15, wherein the electronic switching unit comprises a trigger circuit, which is configured to provide a closing of a semiconductor switch when an electrical voltage is applied between the first terminal and the second terminal.

20. The plug-in contact device of claim 19, wherein the trigger circuit comprises the rectifier bridge.

* * * * *